United States Patent Office 3,179,678
Patented Apr. 20, 1965

3,179,678
METHOD OF PREPARING HYDROXYLATED ORGANOSILICON COMPOUNDS
Norman E. Daughenbaugh, Turtle Creek, Pa., assignor to Dow Corning Corporation, Midland, Mich., a corporation of Michigan
No Drawing. Filed Mar. 29, 1962, Ser. No. 183,420
2 Claims. (Cl. 260—448.2)

This invention relates to a novel method of preparing compounds containing SiOH compounds from compounds containing SiH groups.

The preparation of silanols by the hydrolysis of corresponding chloro- or alkoxysilanes has long been known. This method works quite well for the preparation of the more stable silanols, but suffers from serious disadvantages with the more unstable ones. This is true, because in general, the hydrolysis either produces acid by-products or requires an acidic medium in order to allow the hydrolysis to proceed in a reasonable length of time. However, acids are catalysts for the condensation of silanols to siloxanes. Thus, it is difficult to prevent extensive condensation of the silanol groups to the corresponding siloxane.

This difficulty can be avoided by employing neutral conditions such as, for example, by the hydrolysis of dimethyldiethoxysilane in distilled water, to produce dimethylsilanediol. However, this procedure is quite slow and is not a commercially feasible method for preparing unstable silanols.

It is the object of this invention to provide a novel method for preparing silanols and siloxanols under conditions which do not cause extensive condensation of the silanol groups, and under conditions where the reaction proceeds at a commercially feasible rate. Another object is to provide a feasible method for preparing highly unstable, highly hydroxylated silanols. Other objects and advantages will be apparent from the following description.

This invention relates to a method of preparing SiOH containing organosilicon compounds which comprises reacting (1) an organosilicon compound containing at least one SiH group per molecule and an average of at least one R group attached to the silicon by silicon-carbon linkage per silicon atom, any remaining valences in said compound being oxygen atoms of a SiOSi linkage, R being of the group hydrocarbon radicals, halohydrocarbon radicals, and hydrocarbon radicals containing oxygen in the form of ether linkages, there being no more than one ether linkage attached to any one carbon atom in R with (2) water in contact with (3) a catalyst of the group silver, silver oxide and copper oxide, whereby the SiH groups are converted to SiOH groups.

The basic reaction involved in the process of this invention may be represented schematically by the equation: $SiH + HOH \rightarrow SiOH + H_2$. Thus, it can be seen that there are no acidic or basic by-products of the reaction of this invention. The reaction proceeds spontaneously upon mixing the SiH compound, water and the catalyst and may proceed at room temperature. Often, however, it is advantageous to run the reaction below room temperature, or to heat the reaction at elevated temperatures such as by carrying out the reaction at the refluxing temperature of the solvent. The precise temperature employed must be governed to some extent by the silanol being prepared since obviously the temperature of the reaction should be below that at which extensive condensation of the silanol to siloxane occurs. In general, the reaction should be carried out below 150° C.

In carrying out the reaction of this invention it is preferred that acid and basic contaminates be absent. However, if it is feared that these materials may be introduced by use of impurities in the reaction products, it is desirable to employ a buffer solution which will control the pH at or near 7. If desired, under such conditions, the buffer solution itself may act as the source of water. One suitable buffer solution is that prepared by mixing 0.65 g. of $NaH_2PO_4 \cdot H_2O$ with 39.8 ml. of 0.1 N sodium hydroxide solution and diluting the mixture to one liter with water. Such a solution has a pH of about 7.6.

It should be understood that the use of a buffered aqueous medium is not required but merely serves as insurance against the introduction of acid or basic material which would cause condensation of the silanol hydroxyls.

If desired, the reaction can be carried out in a solvent. Preferably the solvent is one which will dissolve both water and the organosilicon compound. Suitable solvents include ethers such as dioxane or the dimethylether of ethylene glycol and alcohols such as ethanol, isopropanol, t-butanol and the like. It should be understood that the presence of a solvent is not essential for the reaction.

The SiH compound employed in this invention can be either a silane, a siloxane or a silcarbane. The compound can obtain one silicon-bonded hydrogen per molecule or any number of silicon-bonded hydrogen atoms per molecule. Furthermore, the physical nature of the organosilicon reactant is not critical. Thus, the organosilicon compound can be a silane of the formula $RSiH_3$, $R_2SiH_2$ and $R_3SiH$; siloxanes having the unit formulae $RHSiO$, $R_2HSiO_{1/2}$ or $RH_2SiO_{1/2}$; or siloxane copolymers in which one or more of the silicon atoms has a silicon-bonded hydrogen attached thereto in which copolymers the various siloxane units can be, for example, of the formulae $HSiO_{1.5}$, $H_2SiO$, $RHSiO$, $RH_2SiO_{.5}$ $SiO_2$, $RSiO_{1.5}$, $R_2SiO$ and $R_3SiO_{.5}$.

As stated above the organosilicon compound can also be any silcarbane having at least one silicon-bonded hydrogen in the molecule. In these silcarbanes the various silicon atoms can be linked through hydrocarbon, halohydrocarbon or hydrocarbon ether radicals such as those defined below. It should be understood, of course, that the organosilicon compound can contain both SiOSi and silcarbane linkages in the molecule.

For the purpose of this invention, R can be any hydrocarbon radical such as monovalent hydrocarbon radicals such as alkyl radicals, such as methyl, ethyl, isopropyl, t-butyl, or octadecyl; unsaturated aliphatic hydrocarbon radicals such as vinyl, allyl, hexenyl, butadienyl, ethynyl and methallyl; cycloaliphatic hydrocarbon radicals such as cyclohexyl, cyclopentyl, cyclohexenyl or cyclopentenyl; aryl hydrocarbon radicals such as phenyl, xenyl, naphthyl, anthracyl, tolyl, or xenyl; and aralkyl hydrocarbon radicals such as benzyl, β-phenylethyl, or β-phenylpropyl. In addition R can be any monovalent halohydrocarbon radical such as chloromethyl, gamma-chloropropyl, $C_5F_{11}CH_2CH_2$— chlorocyclohexyl bromophenyl, penta-chlorophenyl, α,α,α-trifluorotolyl, bromoxenyl, chloroanthracyl, trifluorovinyl and chlorocyclohexyl. R can also be any monovalent hydrocarbon ether radical in which there is no more than one oxygen per carbon such as gamma-methoxypropyl, gamma-phenoxypropyl, $$-(CH_2)_3OCH_2CH_2OMe, -(CH_2)_3M\overset{Me}{\underset{|}{C}}HCH_2OEt,$$

$$-(CH_2)_3O\left(\overset{Et}{\underset{|}{C}}HCH_2O\right)_{100}Bu \text{ and } -CH_2OCH_2OH_3$$

R can also be any polyvalent hydrocarbon radical such as methylene, dimethylene, trimethylene, $-(CH_2)_{18}-, -CH_2\overset{|}{C}HCH_2-,$

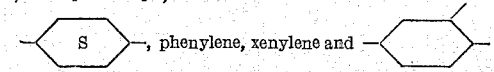, phenylene, xenylene and

R can also be any polyvalent halohydrocarbon radical such as

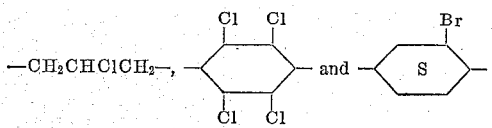

R can also be any polyvalent ether radical such as

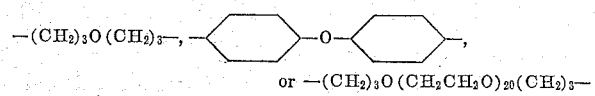

After the SiH compound has been reacted with the water to produce the silanol or siloxanol, the material can be, if desired, separated from the catalyst by any suitable means.

As has been noted the catalysts for the method of this invention are silver, silver oxide and copper oxide. The catalyst should preferably be in a finely divided state, although with copper oxide the use of fine wire is possible. If desired, the catalyst can be dispersed on inert carriers. The amount of catalyst is not critical.

The SiH compounds which are employed as starting materials in the process of this invention can be prepared by well known conventional methods.

The silanols which are produced in this invention are useful as water repellent agents and as intermediates in the preparation of siloxanes.

In this application the following abbreviations are employed, Me for methyl, Et is ethyl, Bu as butyl and Ph for phenyl. The following examples are illustrative only and should not be construed as limiting the invention which is properly delineated in the appended claims.

*Example 1*

0.25 mol of

was dissolved in 350 ml. of dioxane and 2.5 mols of water and .5 mol of copper oxide was mixed with the solution and allowed to stand at room temperature for 2 days. The reaction mixture was filtered into the 2.2 liters of water. This gave a crystalline material which was shown to be the diol

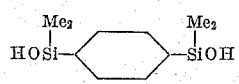

*Example 2*

.05 mol of para-bis(dimethylhydrogensilyl)benzene was dissolved in 70 ml. of dioxane and then mixed with .538 mol of water and .034 mol of silver oxide. A mixture was allowed to react at 25° C. for 2 hours and was then filtered into 250 ml. of water. There was obtained a crystalline compound

*Example 3*

.05 mol of para-bis(dimethylhydrogensilyl)benzene was dissolve in 35.5 g. of t-butanol and one mol of water in the form of a buffer solution [1] and .013 mol of silver powder were added. The mixture was reacted at 25° C. for 22 hours and then filtered into 225 mol of water, whereupon the aqueous diol

was obtained.

*Example 4*

.05 mol of diphenylsilane was dissolved in 109 g. of dioxane and one mol of water was added thereto. Copper oxide was added in amount to give .1 mol of the oxide. The mixture was reacted at 23° to 30° C. for 19 hours and was then filtered into 650 ml. of water, whereupon diphenylsilanediol was obtained as a crystalline material.

*Example 5*

When the following organosilicon compounds are reacted with water in t-butanol solution in the presence of finely divided silver, the following products are obtained:

[1] The buffer solution was prepared by mixing .065 g. of $NaH_2PO_4$ with 8.98 mol of 0.1 N sodium hydroxide and diluting the mixture to 100 ml. with distilled water.

| Organosilicon compound | Product |
|---|---|
| $Ph_3SiH$ | $Ph_3SiOH$ |
| $Me_3Si(OSi)_6OSiMe_3$ with Me and H on central Si | $Me_3Si(OSi)_6OSiMe_3$ with Me and OH on central Si |
| $(Me_3SiO)_2\overset{Me}{\underset{}{Si}}H$ | $(Me_3SiO)_2\overset{Me}{\underset{}{Si}}OH$ |
| $H\overset{Me_2}{\underset{}{Si}}CH_2CH_2\overset{Me_2}{\underset{}{Si}}H$ | $HO\overset{Me_2}{\underset{}{Si}}CH_2CH_2\overset{Me_2}{\underset{}{Si}}OH$ |
| Cl-substituted phenylene with $HSiMe_2$ groups | Cl-substituted phenylene with $HOSiMe_2$ groups |
| phenylene with $HSiMe_2$ and $SiMe_3$ substituent groups | phenylene with $HOSiMe_2$ and $SiMe_3$ substituent groups |
| $C[CH_2O(CH_2)_3\overset{Me_2}{\underset{}{Si}}H]_4$ | $C[CH_2O(CH_2)_3\overset{Me_2}{\underset{}{Si}}OH]_4$ |
| $CH[CH_2O(CH_2)_3\overset{Et_2}{\underset{}{Si}}H]_3$ | $CH[CH_2O(CH_2)_3\overset{Et_2}{\underset{}{Si}}OH]_3$ |

| Copolymer of— | Copolymer of— |
| --- | --- |
| HSi(Me₂)(CH₂)₃OCH₂C≡CCH₂O(CH₂)₃Si(Me₂)H | HOSi(Me₂)(CH₂)₃OCH₂C≡CCH₂O(CH₂)₃Si(Me₂)OH |
| HSi(Me₂)CH₂CH₂CH=CHSi(Me₂)H | HOSi(Me₂)CH₂CH₂CH=CHSi(Me₂)OH |
| ClCH₂CH₂CH₂Si(Me₂)—O—Si(Me₂)H | ClCH₂CH₂CH₂Si(Me₂)—O—Si(Me₂)OH |

That which is claimed is:

1. A method of preparing SiOH-containing organosilicon compounds which comprises reacting
   (1) an organosilicon compound containing at least one SiH group per molecule and an average of at least one R group attached to the silicon by silicon-carbon linkage per silicon atom, any remaining valences in said compound being oxygen atoms of SiOSi linkage, R being selected from the group consisting of hydrocarbon radicals, halohydrocarbon radicals and hydrocarbon radicals containing oxygen in the form of ether linkages, there being no more than one ether linkage attached to any one carbon atom in R, with
   (2) water in contact with
   (3) a catalyst selected from the group consisting of silver oxide and copper oxide, whereby the SiH groups are converted to SiOH groups and hydrogen is evolved.

2. A method of preparing SiOH-containing organosilicon compounds which comprises reacting
   (1) an organosilicon compound containing at least one SiH group per molecule and an average of at least one R group attached to the silicon by silicon-carbon linkage per silicon atom, any remaining valences in said compound being oxygen atoms of SiOSi linkage, R being selected from the group consisting of hydrocarbon radicals, halohydrocarbon radicals, and hydrocarbon radicals containing oxygen in the form of ether linkages, there being no more than one ether linkage attached to any one carbon atom in R, with
   (2) water in contact with
   (3) a catalyst consisting of copper oxide, whereby the SiH groups are converted to SiOH groups.

References Cited by the Examiner

FOREIGN PATENTS 941,286  10/55  Germany.

OTHER REFERENCES

Kautsky et al.: "Zeitschrift für Naturforschung," vol. 11B (1956), pages 301–2.

TOBIAS E. LEVOW, *Primary Examiner.*

SAMUEL H. BLECH, *Examiner.*

| Organosilicon compound | Product |
|---|---|
| $MeO(CH_2CH_2O)_{25}(CH_2)_3\underset{Me_2}{Si}H$ | $MeO(CH_2CH_2O)_{25}(CH_2)_3\underset{Me_2}{Si}OH$ |
| $(C_{18}H_{37}SiO)_3\underset{Et_2}{Si}H$ | $(C_{18}H_{37}SiO)_3\underset{Et_2}{Si}OH$ |
| 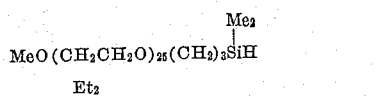 | 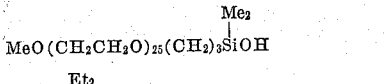 |
|  | 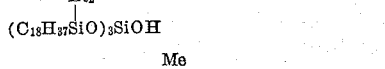 |
| 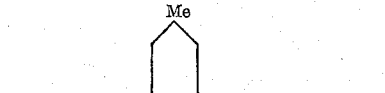 |  |
| 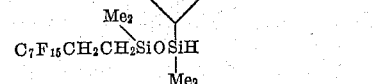 | 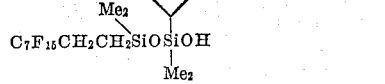 |
| 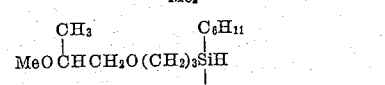 | 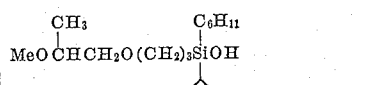 |
| 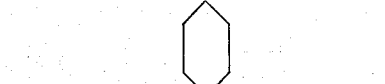 | 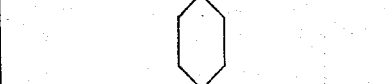 |
| Copolymer of— | Copolymer of— |
| 20 mol percent PhMeSiO<br>40 mol percent PhSiO$_{1.5}$<br>25 mol percent MeSiO$_{1.5}$<br>15 mol percent MeHSiO | 20 mol percent PhMeSiO<br>40 mol percent PhSiO$_{1.5}$<br>25 mol percent MeSiO$_{1.5}$<br>15 mol percent HO$\underset{\vert}{\overset{Me}{Si}}$O |
| 50 mol percent PhSiO$_{1.5}$<br>49 mol percent Me$_2$SiO<br>1 mol percent HSiO$_{1.5}$ | 50 mol percent PhSiO$_{1.5}$<br>49 mol percent Me$_2$SiO<br>1 mol percent HOSiO$_{1.5}$ |
| 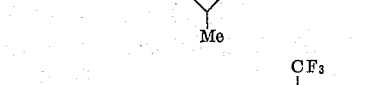 | 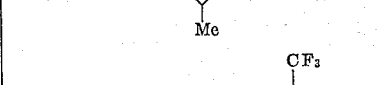 |
|  |  |

UNITED STATES PATENT OFFICE
CERTIFICATE OF CORRECTION

Patent No. 3,179,678                      April 20, 1965

Norman E. Daughenbaugh

It is hereby certified that error appears in the above numbered patent requiring correction and that the said Letters Patent should read as corrected below.

Column 2, lines 61 and 62, the second formula should appear as shown below instead of as in the patent:

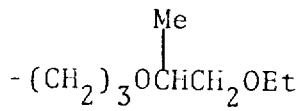

line 65, the second formula should appear as shown below instead of as in the patent:

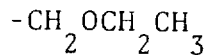

column 4, lines 14 to 16, the formula should appear as shown below instead of as in the patent:

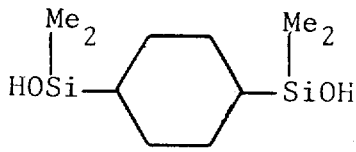

Signed and sealed this 12th day of October 1965.

(SEAL)
Attest:

ERNEST W. SWIDER                      EDWARD J. BRENNER
Attesting Officer                   Commissioner of Patents